(12) United States Patent
Grover et al.

(10) Patent No.: US 7,155,497 B2
(45) Date of Patent: Dec. 26, 2006

(54) CONFIGURING A NETWORK PARAMETER TO A DEVICE

(75) Inventors: Rajeev Grover, Rocklin, CA (US);
Douglas W. Arens, Roseville, CA (US);
Keven Paul Morlang, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1107 days.

(21) Appl. No.: 09/966,620

(22) Filed: Sep. 27, 2001

(65) Prior Publication Data

US 2003/0061320 A1    Mar. 27, 2003

(51) Int. Cl.
*G06F 15/177* (2006.01)
*G06F 15/16* (2006.01)

(52) U.S. Cl. .................. 709/222; 709/220; 709/228
(58) Field of Classification Search ................ 709/220, 709/222, 228
See application file for complete search history.

(56) References Cited

U.S. PATENT DOCUMENTS

| | | | |
|---|---|---|---|
| 6,286,038 B1 * | 9/2001 | Reichmeyer et al. ....... 709/220 |
| 6,385,648 B1 * | 5/2002 | Philippou et al. ........... 709/222 |
| 6,782,474 B1 * | 8/2004 | Ylonen ...................... 713/162 |
| 2002/0161867 A1 * | 10/2002 | Cochran et al. ............ 709/221 |
| 2002/0198969 A1 * | 12/2002 | Engel et al. ................ 709/220 |

\* cited by examiner

*Primary Examiner*—Rupal Dharia
*Assistant Examiner*—Brian J. Gillis

(57) ABSTRACT

Techniques for configuring network parameters to a device are disclosed. In an embodiment, the device is a service processor that provides administrative capabilities to another device and that does not include a terminal. The network parameters include a network address, and configuring is done over a network. A user, from a configuring machine, sends a packet including the to-be-assigned address and the identifier of the configured device to the network. To acquire the packet and thus the address, the configured device regularly checks the network for the packet having the device's identifier. Having acquired the address, the device configures itself, and, to confirm that the address has been configured, the device generates a response to the configuring machine. Once the device is configured with the address, the device disables the automatic configuration feature until the device is in an un-configured state.

21 Claims, 3 Drawing Sheets

CONFIGURING A NETWORK PARAMETER TO A DEVICE

FIELD OF THE INVENTION

The present invention relates generally to accessing network devices and, more specifically, to configuring a network parameter to a device.

BACKGROUND OF THE INVENTION

A device communicating with other devices over a network usually uses network parameters such as a sub-net mask, a gateway, a hostname, a user list, a network address, etc. An Internet Protocol (IP) address is used to identify a network device using the Transmission Control Protocol/Internet Protocol. Typically, an IP address includes a 32-bit number written as four numbers separated by periods and ranging from 0 to 255.

Currently, to configure an IP address for a device, a user, through the device's terminal, runs a set of configuring commands. As the technology evolves and to save equipment space, many devices no longer include a terminal. In those cases, the user must physically connect cables between the terminal and the device to get access to the device and thus perform the configuration. In various situations, connecting a terminal to the configured device is not easy because the device may be at a location difficult to reach, in an equipment stack bundled with other equipment, etc. Further, a terminal must have an input channel such as a keyboard for the user to enter the commands.

In one approach, once a device is configured with an IP address, the device is accessible over a network, and a user uses a machine connecting over the network to the device to manually configure the device with other parameters. The user commonly types each configuration value of the parameters and sends them over the network to be configured. Such manual configuration can be tedious and inconvenient.

Based on the foregoing, it is clearly desirable that mechanisms be provided to solve the above deficiencies.

SUMMARY OF THE INVENTION

The present invention, in various embodiments, provides techniques for configuring a network parameter to a device. In one embodiment, network parameters include a network address, and configuring is done over a network to eliminate the requirement of physically attaching a terminal to the configured device. At configuration time, the device is connected to a network having a configuring machine A user, from this configuring machine, sends a packet including the to-be-assigned address and the identifier of the configured device to the network. To acquire the packet and thus the address, the configured device regularly checks the network for the packet having the device's identifier. Having acquired the address, the device configures itself, and, to confirm that the address has been configured, the device generates a response to the configuring machine. Once the device is configured with the address, the device disables the automatic configuration feature until the device is in an un-configured state. Further, the device is accessible over the network through telnet, a web browser, or any other communication protocol.

In one embodiment, configuration commands and configuration information are also sent with the to-be-configured address, the to-be-configured address its an IP address, the device identifier is a MAC address, and the device is a service processor that provides administrative capabilities to the server and that does not include a terminal. The service processor also provides an additional network connection besides other network connections provided by the server, provides access to the server console, event logs, power management functions, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention, in various embodiments, provides techniques for configuring a network parameter to a device. In one embodiment, configuring is done over a network to eliminate the requirement of physically attaching a terminal to the configured device. In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

System Overview

Figure 1:
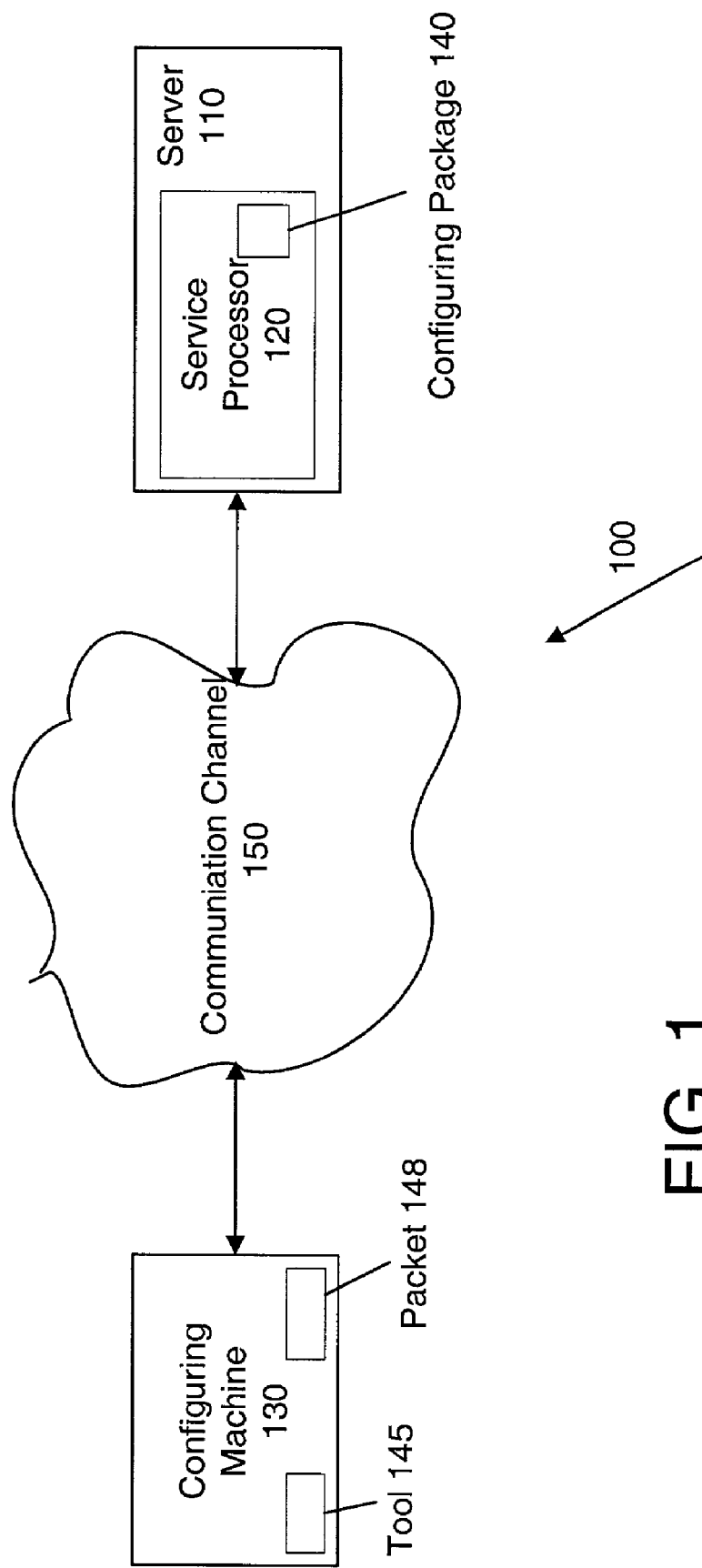
FIG. 1 shows an exemplary system upon which embodiments of the invention may be implemented.

FIG. 1 shows a network 100 upon which embodiments of the invention may be implemented. Network 100 includes a server 110, a service processor 120, a configuring machine 130, and a communication channel 150.

In one embodiment, server 110 is a Unix server and includes service processor 120 on a card being part of server 110. Server 110 may be configured with an IP address, which can be used to identify service processor 120 on communication channel 150. Other identifiers of server 110 such as a Media Access Control (MAC) address, an Asynchronous Transfer Mode (ATM) address, etc., may also be used to identify service processor 120 on communication channel 150. In one embodiment, through appropriate hardware and/or software, server 110 communicates with service processor 120 via a bus, a point-to-point interconnect, an input/output (I/O) interconnect, other interconnect mechanisms, etc., including, for example, a Peripheral Component Interconnect (PCI) bus, an Industry Standard Architecture (ISA) bus, an Extended Industry Standard Architecture (EISA) bus, a Personal Computer Memory Card International Association (PCMCIA) card, an infini band, etc. Server 110 may receive the to-be-configured IP address and configuration information for service processor 120, and transmits them to service processor 120.

In one embodiment, service processor 120 includes hardware and software to provide administrative capabilities to server 110, such as providing event monitor and notification, power management, and access to console of server 110. Service processor 120 acts as a console and front panel display redirector, allowing a user via a console client to have the same set of functionalities and level of controls of server 110. Service processor 120 allows interactions between a console client and program applications on server 110. This console client may be connected to server 110 locally, e.g., through asynchronous links, or remotely, e.g., through a network. Those skilled in the art will recognize that a console is means from which a user gets access to some specific functions of a computer system, including, for example, checking status of the system, performing system administration, updating system software, configuring system hardware, etc. Normally, a console, being used interchangeably with a terminal, includes a monitor and a keyboard or input device. Service processor 120 also provides system support and management functions for server 110, including providing remote access over a network for managing server 110's boot and reset, providing remote maintenance such as power management, event logs, and event filtering and notifications, etc. In one embodiment, each console client connected to service processor 120 may mirror server 110's console. That is, operations in a console client can be observed in other console clients. In one embodiment, service processor 120 is integrated as an input/output (I/O) device to server 110, and acts as an autonomous embedded device, which is powered independently and runs embedded applications independent of server 110's state. Server 110 may properly function with or without service processor 120 or with service processor 120 being inoperative. In one embodiment, service processor 120 is commercially available without a terminal, and service processor 120 is referred to as an embedded management processor or device because service processor 120 is part of server 110 and provides management services for server 110.

In one embodiment, service processor 120 includes a Local Areas Network (LAN) connection that supports the TCP/IP protocol for network connections. Service processor 120 is to be configured with an IP address and/or other network parameters. Service processor 120's IP address is normally provided by a system administrator and is different from the IP address of server 110. Parameters to be configured to service processor 120 include, for example, a subnet mask, a gateway, a hostname or a user list for service processor 120, etc.

Commonly, service processor 120 is assigned a unique MAC address, which is used in a MAC layer being one of the several layers in network protocols. On one side, the MAC layer, through a LAN connection, interfaces directly with the network media. On the other side, the MAC layer interfaces with the IP layer, the application layer, etc. In one embodiment, the MAC address is used to identify service processor 120 on communication channel 150.

Service processor 120 in one embodiment includes a configuration package 140 for configuring service processor 120. Configuration package 140 interacts with other processing mechanisms, e.g., a networking module, of service processor 120 to configure the IP address and other parameters. Configuration package 140 receives data packet including the to-be-configured IP address and configuration information from this networking module. Configuration package 140, upon receiving a valid packet, extracts the IP address from the packet, and, in one embodiment, before accepting the IP address, configuration package 140 issues a Reverse Address Resolution Protocol (RARP) command with this IP address to verify that this IP address is valid, e.g., has not been used for another device. In response to an RARP command, if the IP address has been used for a device, then the MAC address of the device is identified. However, if the IP address has not been used, then no MAC is identified, and the received IP address is thus valid for use with service processor 120. In one embodiment, configuration package 140 passes the valid IP address to the networking module, which in turn configures this IP address to service processor 120.

Configuration package 140 also includes network information of service processor 120, determining, e.g., what, where, when, how, etc., to receive the network packet, what, where, when, how, etc., to send a response, etc. In one embodiment, configuration package 140, upon receiving the to-be-configured IP address, determines whether service processor 120 has been configured with an IP address. If service processor 120 has not been configured, then configuration package 140 configures service processor 120 with the IP address. After configuration, configuration package 140 turns off the configuration feature to inhibit future configurations, e.g., configuration package 140 disregards any request for future configurations until service processor 120 is in an un-configured state. However, if service processor 120 has been configured, then configuration package 140, in accordance with the turn-off configuration feature, inhibits a new configuration. In one embodiment, configuration package 140 starts running as soon as service processor 120 is powered up. Any intelligence logic can perform the functions of configuration package 140. Service processor 120, through other processing mechanisms, may configure itself.

Once configured with an IP address, service processor 120 is accessible from networks using the TCP/IP protocol, including, for example, telnet, a web browser, etc. A user, through a TCP/IP protocol and service processor 120, can configure other network parameters such as service processor 120's name, netmask, gateway IP address, etc. In one embodiment, these parameters and their associated information are also sent with the IP address as a packet to service processor 120, instead of being manually sent after the configuration of the IP address. Other commands can also be sent with the IP address, e.g., in the same packet. These commands include, for example, clearing the logging information, upgrading service processor 120's firmware, turning on and off electrical power of server 110.

A user uses configuring machine 130 to configure and send other configuration information over communication channel 150 to service processor 120. Machine 130 can be any computer capable of communicating with communication channel 150, including, for example, a personal computer (PC), a Unix workstation, a laptop, etc. In one embodiment, a server 110 may be used in place of configuring machine 130 for configuring service processor 120.

In one embodiment, a user, from configuring machine 130, issues a set of address resolution protocol (ARP) and packet internet groper (PING) commands for configuration purposes. An ARP command having an IP address and a MAC address registers the IP address corresponding to the MAC address in an ARP table normally resided in configuring machine 130. A PING command with an IP address transmits the IP address and the corresponding MAC address in the ARP table over communication channel 150. Normally, the IP address and the MAC address are included in a PING packet.

In one embodiment, instead of a set of ARP and PING commands, different commands, command files, scripts, or programs, etc., may be used to send the to-be-assigned IP address over communication channel 150 to service processor 120. The command files, scripts, or programs may in turns include the set of ARP and PING commands. Service processor 120 may receive the IP address directly or indirectly, e.g., the address may be sent to a table, server 110, or a third device, etc., then to service processor 120. In case going through server 110, the IP address, the MAC address, the ATM address, or other identity of server 110 may be used as an identifier.

In one embodiment, additional configuration information may accompany the IP address so that other parameters are also configured to service processor 120. As a result, the user does not have to manually configure these parameters after waiting for the IP address to be configured. These parameters include, for example, a subnet mask, a gateway, a hostname for service processor 120, a user list for service processor 120, etc. In one embodiment, configuring machine 130 includes a tool 145, usually software, that generates a packet 148 to include data for configuring these parameters. This packet 148 includes, for example, the data and the specification for the format of the data. In one embodiment, packet 148 is useable for the set of ARP and PING command, e.g., a PING command can consider packet 148 as a PING packet, etc. A user, through software tool 145, can also specify commands to be executed by service processor 120. Normally, these commands are executed after configuration of service processor 120, and include, for example, "clear the logging information," "upgrade firmware" for service processor 120, "turning on or off" electrical power of server 110, etc. Formats for configuration data and commands vary, including, for example, tags and value pair, values in a specified sequence, extensive markup language (XML) tags, text string, etc.

Communication channel 150 is any mechanism for configuring machine 130 to communicate with service processor 120. Communication channel 150 may be a single network or a combination of networks that utilizes one or a combination of communication protocols such as the Transmission Control Protocol/Internet Protocol (TCP/IP), the Public Switched Telephone Network (PSTN), the Digital Subscriber Lines (DSL), the cable network, the satellite-compliant network, the wireless-compliant network, etc. In one embodiment, communication channel 150 is a LAN.

Method Steps in Accordance with One Embodiment

Figure 2:
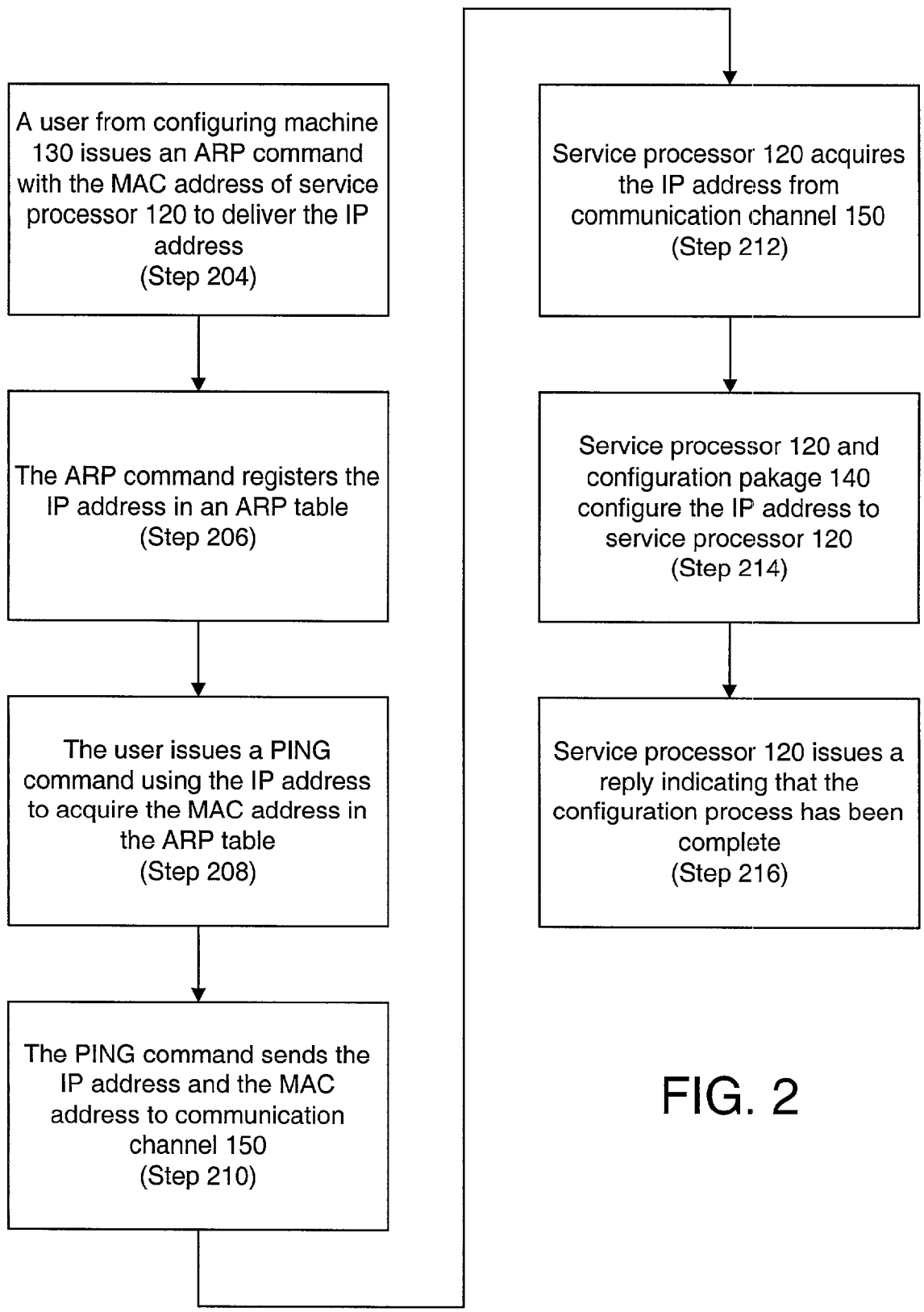
FIG. 2 is a flowchart illustrating a method for configuration an IP address to service processor 120 in FIG. 1.

FIG. 2 is a flowchart illustrating a method for configuring an IP address for service processor 120 over communication channel 150, in accordance with one embodiment.

In step 204, a user, from configuring machine 130, sends the assigned IP address and an identifier of service processor 120 to communication channel 150 In one embodiment, the user uses a set of ARP and PING commands, and the identifier is the MAC address. The user thus issues the command ARP-s IP_address MAC_address where IP_address is the IP address to be configured on service processor 120, and MAC_address is a MAC address uniquely assigned to service processor 120. The "-s" option causes the IP_address associated with the MAC_address to be stored in an ARP table for use by network communication programs.

The ARP command in step 206 registers the IP address in the ARP table. In step 208, the user issues the command PING IP_address, which accesses the ARP table to acquire the MAC address corresponding to the IP_address. In step 210, the PING command sends a PING packet including the IP_address and the acquired MAC address to communication channel 150.

In one embodiment, service processor 120 regularly polls communication channel 150 for the PING packet having the MAC address of service processor 120. Service processor 120 may start polling communication channel 150 as soon as service processor 120 is powered up or at any convenient time.

As the PING packet appears in communication channel 150, service processor 120, in step 212, recognizes the PING packet from which service processor 120 acquires the to-be-assigned IP address.

In step 214, service processor 120 and configuration package 140 configure the IP address to service processor 120. In one embodiment, service processor 120 sends the PING packet to configuration package 140. Further, if service processor 120 has not been assigned an IP address, then configuration package 140 allows service processor 120 to be configured with this IP address. Once service processor 120 is configured with the IP address, configuration package 140 turns off the self-configuration feature, i.e., configuration package 140 prevents service processor 120 from being configured with another IP address. However, if service processor 120 has been configured with an IP address, configuration package 140 ignores the configuration request. In step 216, service processor 120 sends a reply to configuring machine 130 indicating that the configuration process has been completed.

Variations

The method illustrated in FIG. 2 is only used as an example, various variations are within the scope of the disclosed techniques. For example, other parameters can be configured to service processor 120 using the described method. These parameters and/or other configuration information can be sent together with the to-be-configured IP address or sent independently with this IP address, the set of ARP and PING commands can be used with different syntax in different systems, etc. As an example, if the MAC address for service processor 120 is 009022455667, and the to-be-assigned IP address is 11.11.2.25, different systems receive different commands for configuring an IP address as follows:

MS Windows
    arp -s 11.11.2.25 00-90-22-45-56-67
    ping 11.11.2.25

Unix and Linux
    arp -s 11.11.2.25 00:90:22:45:56:67
    ping 11.11.2.25

AIX, where the Ethernet serves as communication channel 150
    arp -s ether 11.11.2.25 00:90:22:45:56:67 temp
    ping 11.11.2.25

AIX, where a token ring serves as communication channel 150
    arp -s 802.5 11.11.2.25 00:90:22:45:56:67
    ping 11.11.2.25

Those skilled in the art will recognize Microsoft Windows, Unix, Linux, and AIX (Advanced Interactive executive) refer to operating systems commonly used in computers including, for example, PC, workstation, laptop, desktop, etc.

Computer System Overview

Figure 3:
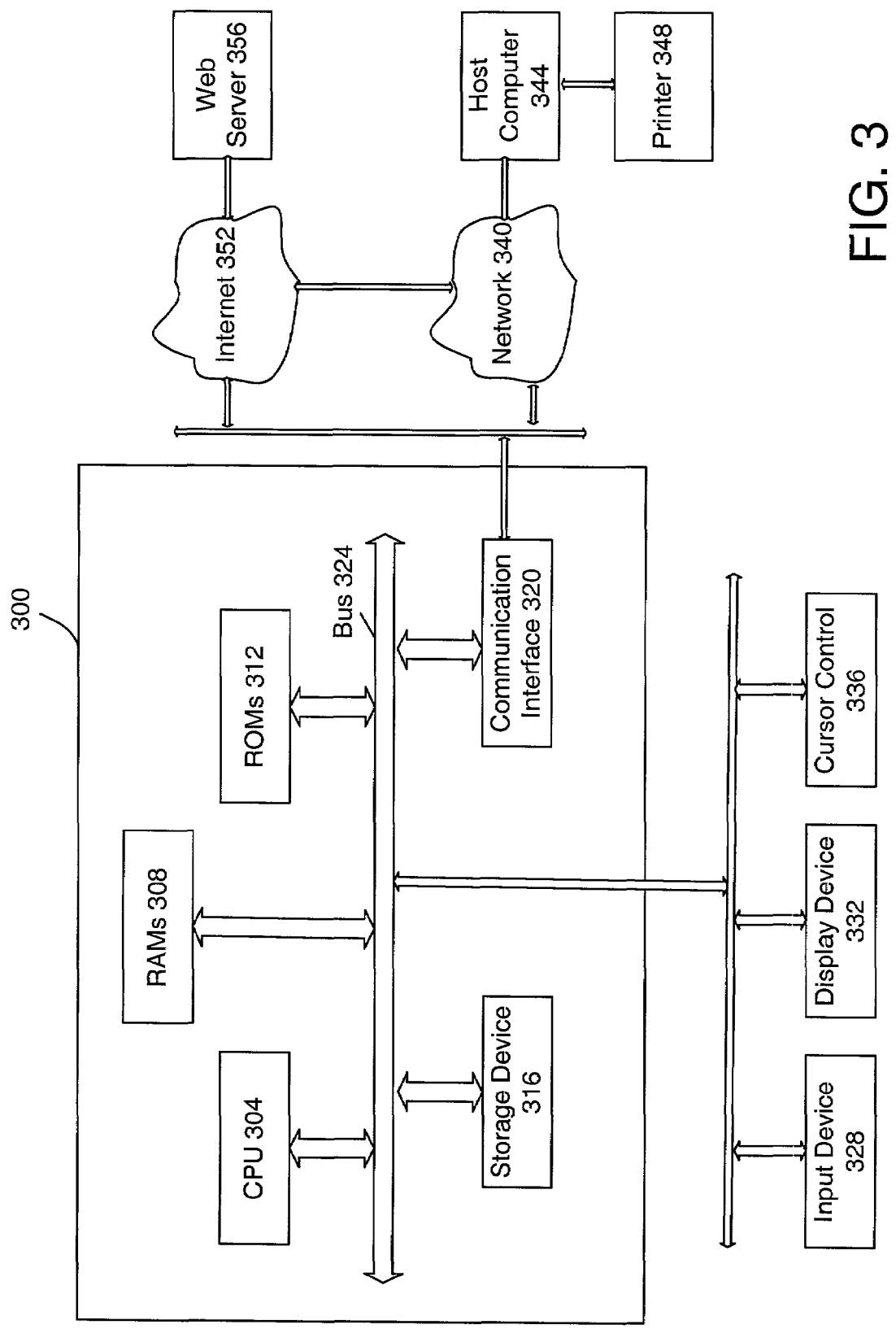
FIG. 3 shows a computer system upon which embodiments of the invention may be implemented.

FIG. 3 is a block diagram showing a computer system 300 upon which an embodiment of the invention may be implemented. For example, computer system 300 may be implemented to operate as service processor 120 or configuring machine 130, or to perform the techniques disclosed above, etc. In one embodiment, computer system 300 includes a processor 304, random access memories (RAMs) 308, read-only memories (ROMs) 312, a storage device 316, and a communication interface 320, all of which are connected to a bus 324.

Processor 304 controls logic, processes information, and coordinates activities within computer system 300. In one embodiment, processor 304 executes instructions stored in RAMs 308 and ROMs 312, by, for example, coordinating the movement of data from input device 328 to display device 332.

RAMs 308, usually being referred to as main memory, temporarily store information and instructions to be executed by processor 304. Information in RAMs 308 may be obtained from input device 328 or generated by processor 304 as part of the algorithmic processes required by the instructions that are executed by processor 304.

ROMs 312 store information and instructions that, once written in a ROM chip, are read-only and are not modified or removed. In one embodiment, ROMs 312 store commands for configurations and initial operations of computer system 300.

Storage device 316, such as floppy disks, disk drives, tape drives, flash memory, durably stores information for used by computer system 300.

Communication interface 320 enables computer system 300 to interface with other computers or devices. Communication interface 320 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 320 may also allow wireless communications.

Bus 324 can be any communication mechanism for communicating information for use by computer system 300. In the example of FIG. 3, bus 324 is a media for transferring data between processor 304, RAMs 308, ROMs 312, storage device 316, communication interface 320, etc.

Computer system 300 is typically coupled to an input device 328, a display device 332, and a cursor control 336. Input device 328, such as a keyboard including alphanumeric and other keys, communicates information and commands to processor 304. Display device 332, such as a cathode ray tube (CRT), displays information to users of computer system 300. Cursor control 336, such as a mouse, a trackball, or cursor direction keys, communicates direction information and commands to processor 304 and controls cursor movement on display device 332.

Computer system 300 may communicate with other computers or devices through one or more networks. For example, computer system 300, using communication interface 320, communicates through a network 340 to another computer 344 connected to a printer 348, or through the world wide web 352 to a server 356. The world wide web 352 is commonly referred to as the "Internet." Alternatively, computer system 300 may access the Internet 352 via network 340.

Computer system 300 may be used to implement the techniques described above. In various embodiments, processor 304 performs the steps of the techniques by executing instructions brought to RAMs 308. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 304 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, etc. As an example, the instructions to be executed by processor 304 are in the form of one or more software programs and are initially stored in a CD-ROM being interfaced with computer system 300 via bus 324. Computer system 300 loads these instructions in RAMs 308, executes some instructions, and sends some instructions via communication interface 320, a modem, and a telephone line to a network, e.g. network 340, the Internet 352, etc. A remote computer, receiving data through a network cable, executes the received instructions and sends the data to computer system 300 to be stored in storage device 316.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for configuring a first parameter to a first device, comprising the steps of:
   providing a network communication channel connected to the first device and to a configuring machine;
   from the configuring machine, sending the first parameter and a device's identifier to the communication channel;
   acquiring the first parameter upon identifying the device's identifier on the communication channel;
   configuring the first parameter to the first device; and
   turning-off a feature to configure the first device until the first device is in an un-configured state;
   wherein the first device is embedded in a second device and provides administrative capabilities to the second device.

2. The method of claim 1 wherein the first device further provides console capabilities to the second device.

3. The method of claim 1 wherein the step of sending comprising the steps of:
   sending the first parameter to a table in the configuring machine; and
   obtaining the first parameter from the table.

4. The method of claim 3 wherein:
   the first parameter is an internet protocol address;
   an address resolution protocol command sending the internet protocol address to the table; and
   a packet internet groper protocol command obtaining the internet protocol address from the table.

5. The method of claim 1 wherein the device's identifier is a media access control address of the first device.

6. The method of claim 1 wherein the first device performing the step of acquiring the first parameter.

7. The method of claim 1 wherein the step of acquiring comprises the steps of:
the second device obtaining the first parameter, and
acquiring the first parameter from the second device.

8. The method of claim 1 wherein the first device communicates with the second device via an interconnect selected from a group consisting an input-output interconnect, a peripheral component interconnect bus, an industry standard architecture bus, an extended industry standard architecture bus, an infini band, and a personal computer memory card international association standard.

9. The method of claim 1 wherein the device's identifier is selected from a group consisting of an internet protocol address of the second device, a media access control address of the second device, and an asynchronous transfer mode address of the second device.

10. The method of claim 1 further comprising the step of configuring a second parameter to the first device, the second parameter being sent with the first parameter in a packet.

11. The method of claim 1 further comprising the step of sending a command with the first parameter in a packet, the command being executed in the first device.

12. The method of claim 1 wherein the step of acquiring comprises the step of checking whether the first parameter is valid.

13. A method for configuring a parameter to a first device, comprising the steps of:
providing a network communication channel connected to the first device and to a configuring machine;
from the configuring machine, sending the parameter and a device's identifier to the communication channel;
acquiring the parameter upon identifying the device's identifier on the communication channel;
configuring the parameter to the first device; and
turning-off a feature to configure the first device until the first device is in an un-configured state;
wherein the first device is embedded in a second device and selected from a group consisting of
a device providing tools managing the second device;
a device providing mirror capabilities to the second device;
a device providing interactions between the second device and a third device; and
a device providing console capabilities to the second device.

14. A network comprising:
a first device being embedded in a second device and providing administrative capabilities to a second device;
a network communication channel connecting the first device and a configuring machine;
means for sending a network address and a device's identifier from the configuring machine to the communication channel;
means for acquiring the network address upon identifying the device's identifier on the communication channel; and
means for the first device to configure the network address to the first device;
wherein after the first device is configured with the network address, a feature to configure the first device is turned off until the first device is in an un-configured state.

15. The network of claim 14 wherein the device's identifier is a media access control address of the first device.

16. The network of claim 14 wherein the first device further provides console capabilities to the second device.

17. A computer-readable medium embodying instructions for a computer to perform a method for configuring a network address to a first device, the method comprising the steps of:
providing a network communication channel connected to the first device and to a configuring machine;
from the configuring machine, sending the network address and a device's identifier to the communication channel;
acquiring the network address upon identifying the device's identifier on the communication channel;
configuring the network address to the first device; and
turning-off a feature to configure the first device until the first device is in an un-configured state;
wherein the first device is embedded in a second device and provides administrative capabilities to the second device.

18. The computer-readable medium of claim 17 wherein the device's identifier is a media access control address of the first device.

19. The computer-readable medium of claim 17 wherein the first device further provides console capabilities to the second device.

20. The computer-readable medium of claim 17 wherein the method further comprising the step of configuring a second parameter to the first device, the second parameter being sent with the first parameter in a packet.

21. The computer-readable medium of claim 17 wherein the method further comprising the step of sending a command with the first parameter in a packet, the command being executed in the first device.

* * * * *

UNITED STATES PATENT AND TRADEMARK OFFICE
CERTIFICATE OF CORRECTION

PATENT NO. : 7,155,497 B2
APPLICATION NO. : 09/966620
DATED : December 26, 2006
INVENTOR(S) : Rajeev Grover et al.

It is certified that error appears in the above-identified patent and that said Letters Patent is hereby corrected as shown below:

In column 1, line 66, delete "its" and insert -- is --, therefor.

Signed and Sealed this

Twenty-second Day of December, 2009

David J. Kappos
*Director of the United States Patent and Trademark Office*